Sept. 16, 1924.
H. V. WILLMAN
SHADE HOLDER
Filed Oct. 12, 1922
1,509,073
2 Sheets-Sheet 1
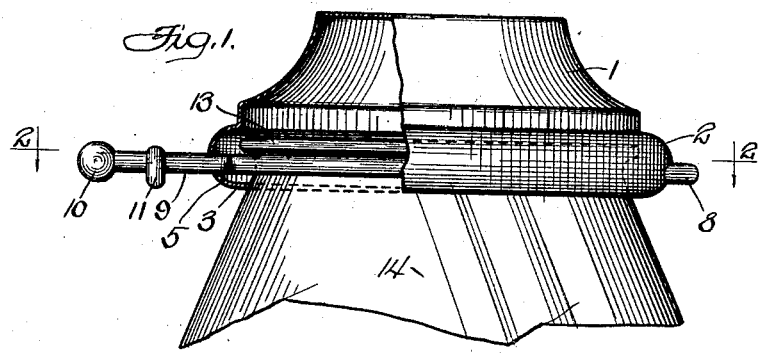
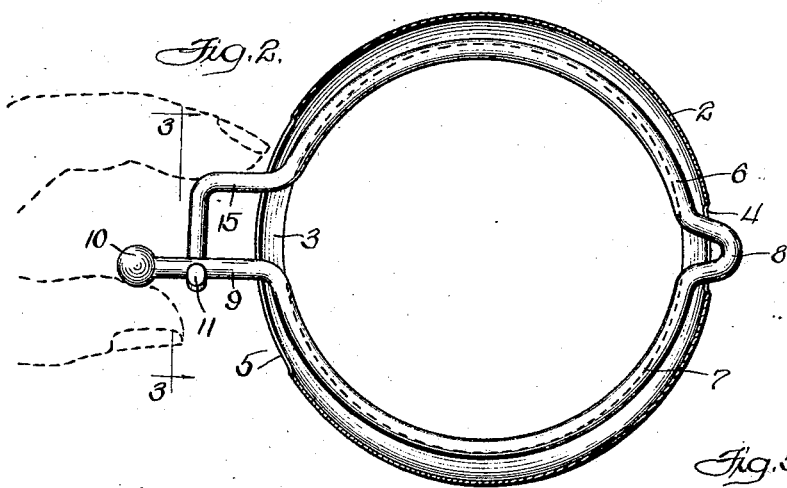
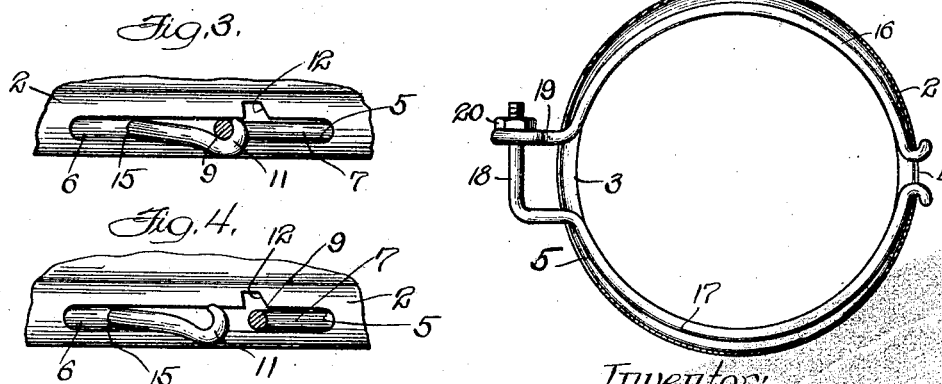
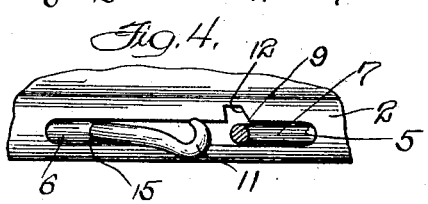
Inventor:
HERMAN V. WILLMAN

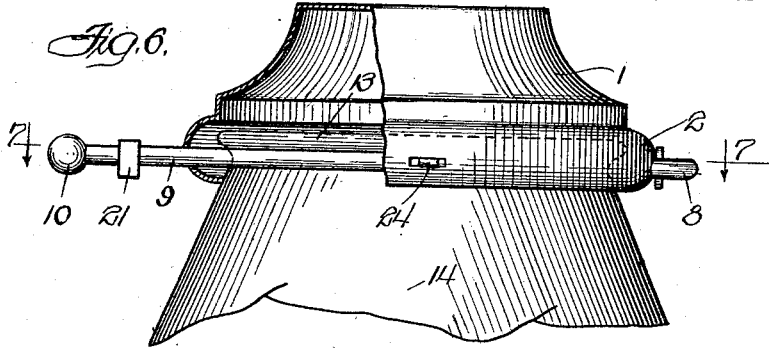
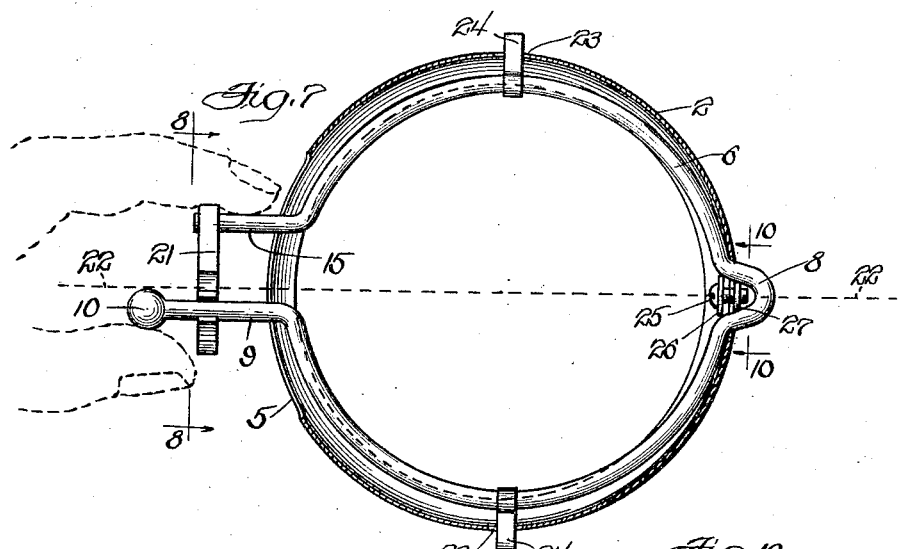
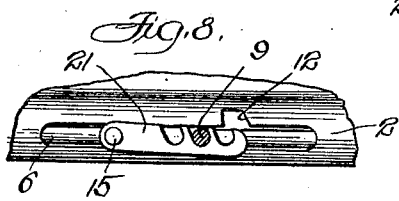
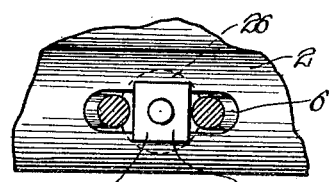
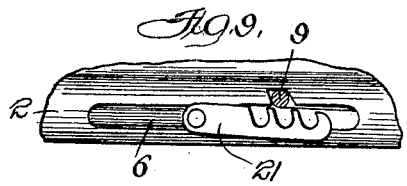

Patented Sept. 16, 1924.

1,509,073

UNITED STATES PATENT OFFICE.

HERMAN V. WILLMAN, OF MAYWOOD, ILLINOIS.

SHADE HOLDER.

Application filed October 12, 1922. Serial No. 594,001.

*To all whom it may concern:*

Be it known that I, HERMAN V. WILLMAN, citizen of the United States, residing at Maywood, Illinois, have invented certain new and useful Improvements in Shade Holders; and I do hereby declare the following to be a full, clear, and exact description of the invention, such as will enable others skilled in the art to which it appertains to make and use the same, reference being had to the accompanying drawings.

The invention disclosed in this application relates to holders for detachably connecting two objects, and in its immediately commercial embodiment relates to a holder for supporting a reflector, globe or shade from a lighting fixture or other support. In some of its general objects, my invention aims to provide a simple, inexpensive and easily manipulated holder which will distribute its gripping strain over a considerable portion of the object engaged thereby, which will be ample in strength and rigidity for supporting relatively heavy objects, which will not be loosened by jarring although readily loosened when desired, and which will be both compact and neat in appearance. Furthermore, it aims to provide a shadeholder in which the shade will be maintained in a predetermined position with respect to the holder collar, and for this purpose aims to provide means for preventing the axis of the shade-gripping portion from being tilted out of alinement with that of the holder collar, and for preventing a relative sliding of these two portions.

In one of its desirable embodiments, my invention also aims to provide a holder of the class described which may readily be latched or unlatched without the use of tools, and which will be locked to prevent an unlatching by accidental impact against exposed portions of the holder, but which can readily be latched or unlatched manually when the interlocking parts are in predetermined positions, and which can be adjusted to adapt itself to shades or globes having necks of different sizes. Still further objects will appear from the following specification and from the accompanying drawings, in which—

Figure 1 is a fragmentary elevation of a simple type of holder embodying my invention, namely one in which one end of a single wire loop interlocked with the other end of the loop.

Figure 2 is a horizontal section through Figure 1 along the line 2—2.

Figure 3 is a fragmentary vertical elevation taken from the line 3—3 of Figure 2 and showing the holder in its latched or holding position.

Figure 4 is a similar view with the holder unlatched.

Figure 5 is a fragmentary horizontal section of a holder having the loop formed of two separate portions and employing a threaded nut for the interlocking.

Figure 6 is a view, partly in elevation and partly in central and vertical section, showing an adjustable shadeholder embodying my invention, namely one which provides for three definite adjustments of the wire loop so as to afford a firm hold for shades or globes having three different sizes of necks, and which is provided with means for preventing the wire loop from tilting with respect to the holder collar and from sliding out of substantially axial alinement with this collar.

Figure 7 is a horizontal section through the same embodiment, taken along the line 7—7 of Fig. 6, with the holder latched in operative position.

Fig. 8 is a fragmentary vertical section, taken along the line 8—8 of Fig. 7 and showing the adjustable latching features as it appears when the holder is latched in its intermediate position.

Fig. 9 is a similar view showing the same parts in the position which they occupy when the holder is being unlatched.

Fig. 10 is a fragmentary vertical section, taken along the line 10—10 of Fig. 7 and showing a part of the means for preventing the wire loop of the holder from sliding with respect to the holder collar.

Fig. 11 is a perspective view of one of the guides which prevent the wire loop of the holder of Figs. 6 and 7 from tilting, showing this guide as it appears before it is welded or soldered to the wire loop.

In the embodiment of Figs. 1 to 4, (which figures are duplicated from my said previous application) my invention includes a holder collar 1 desirably spun out of sheet metal and included a hollow bead 2 terminating in a ledge 3 which affords a contracted mouth for the portion of the collar formed by the said bead. The bead portion 2 is provided at one edge with an aperture 4 and diametrically opposite thereto with a considerably wider slot 5, both the aperture and the slot being slightly larger in their width vertically of the collar than the wire of which the shade-engaging portion or holder loop of the holder is made. This holder loop is here shown as comprising two approximately semi-circular loop parts 6 and 7 connected to each other by a relatively smaller intermediary loop or bight 8 which projects through the smaller aperture 4 of the collar, while the free ends of the curved portions 6 and 7 extend through the larger aperture or slot 5. One of these free ends desirably consists of a stem 9 equipped with a knob 10, while the other desirably includes a hook 11 normally in horizontal alinement with the main portions of the said wire loop and the stem 9, and thereby adapted to interlock with this stem 9 as shown in Figure 3. The slot 5 desirably extends parallel to the plane of the mouth of the collar, and desirably is laterally enlarged at one point by a recess 12 approximating the diameter of the stem 9 in size and thus adapted to receive this stem if the latter is raised with respect to the collar of the appliance. Consequently, by swinging the holder horizontally about the substantially pivotal connection between the medial loop 8 and the aperture through which this projects and thereby moving the holder out of its normal position of Figure 3 into a position in which the stem 9 alines vertically with the recess 12, this recess will be adapted to receive the stem 9 and to let the latter slide over the tip of the hook 11. For this latter purpose, it is only necessary to shift the holder to the said position and then to press the free end portions of the wire towards each other manually by approaching the fingers as shown in dotted lines in Figure 2. By this simple manipulation, the interlocked ends of the holder loop are unsnapped, whereupon the resiliency of the wire opens the loop and permits the insertion or withdrawal of the bead portion 13 of the reflector or shade 14. Likewise, the shade-supporting loop can be instantly latched again in its operative position by correspondingly shifting the loop to bring the stem 9 opposite the recess 12, (as shown in Figure 4) and then digitally pressing the free end portions of the loop towards each other.

Normally, the tendency of the shade, particularly if heavy, to flex the opposite sides of the loop 6 and 7 downwardly, will press these portions against the parts of the collar which curve upwardly from the ledge 3. This action will cooperate with the substantially pivotal engagement of the intermediary loop 8 with the adjacent apertured portion of the collar in centering the wire member of my appliance and thereby bringing it into the position of Figures 2 and 3. Consequently, an accidental upward thrust against the stem 9 or the knob 10 carried by the latter will only cause this stem to engage the upper edge of the slot 5, but will not unlatch the free ends of the wire member. Likewise, a lateral thrust against the stem 9 will rock the entire wire member bodily about the engagement of the intermediary loop 18 with an edge of the aperture 4, and thereby moving this member to positions where the stem 9 is at either one side or the other from the recess 12 according as the thrust came from one side or the other. In other words, the relatively narrow width or height of the slot 5 guards against an accidental interlocking of the holder, so that this can only be unlatched by first moving the holder horizontally to a certain position and by then pressing the portions 9 and 15 towards each other. In practice, the movement required for this purpose is no greater than that introduced by the clearance which is required between the wire parts 6 and 7 and the adjacent parts of the collar in order that the holder loop may be expanded sufficiently to clear the bead 13 which is immediately above the neck of the shade.

However, while I have pictured and described this simple embodiment of my invention as including a single-piece wire member having one end formed directly into a hook for engaging another projecting portion of the wire member, and as depending on the resiliency of this wire member for expanding the same when these ends are disengaged from each other, I do not wish to be limited to this construction. For example, the wire portion operatively supporting the shade within the collar may consist of two separate parts 16 and 17 each equipped at its rear end with a tip extending through the smaller aperture in the collar. Moreover, the opposite end of one of these members may be equipped with a threaded portion 18 extending through a loop 19 on the other member, and a nut 20 threaded upon the end 18 may form the means for drawing the adjacent projecting portions of the wire members towards each other and for holding the latter in operative position with respect to the shade. In this case, the resiliency of these wire members will afford a spring lock for preventing a backing of the nut 20, and will thereby prevent an unlatching of the holder parts.

When the simple embodiment of Figs. 1 and 2 is employed with light and small sized shades or globes, the small size of wire required for the holder loop will permit of sufficient change in curvature to accommodate considerable variations in the diameters of the necks. However, the larger diameter of wire required for supporting large and heavy shades will not readily permit such adjustments, hence my invention also includes the providing of means whereby the holder loop can be latched in a plurality of positions corresponding to different effective diameters of the loop. It also includes the providing of means for preventing the holder loop from rocking about the bight of the loop as a pivot, and from shifting transversely of the holder collar so as to vary the extent to which the bight projects through the collar.

To accomplish the first of these added purposes, I provide the holder loop with a plurality of hooks which may be interchangeably engaged by the stem 9 of the loop, as by welding or brazing to the other end portion 15 of the loop a hook element 21 having a series of consecutively disposed hook formations as shown in Figs. 7 to 9 inclusive. With this arrangement, the tips of the hooks are desirably all in one plane and by bringing any one of the hook openings opposite the recess 12 the stem 9, as shown for the intermediate recess in Fig. 9, the stem 9 can readily be latched with or unlatched from the corresponding hook opening.

To prevent the holder loop from rocking about the axis 22 of Fig. 7, I provide co-operating means on the holder and collar, these means being spaced circumferentially of the holder from both the slot 5 and the bight 8. For this purpose I am here showing the beaded portion 2 of the holder collar as having a pair of opposed slots 23 disposed substantially at right angles to the said axis 22, and am showing the holder loop as carrying two guides 24 which extend respectively through the said slots 23. Each of these guides in this instance consists of a thin sheet metal clip, shown in an enlarged perspective view in Fig. 11, which clip has its oppositely concaved free ends soldered or welded to the holder loop while its bight is flattened so as to pass through a slot of inconspicuous size. By making the slots 23 slightly longer than the width of the guide projecting through it, I can allow for the slight departure from a rectilinear movement which is due to the expansion and contraction of the wire loop.

While such a guide and guide slot arrangement will also tend to prevent the holder loop from sliding transversely of the holder collar along the axis 22, I desirably provide more positive anchoring means for this purpose, particularly on large sized embodiments of my invention, and desirably attain this object by clamping the bight of the loop to the holder collar adjacent to the slot through which the bight projects. Thus, I am here showing an anchoring bolt having a threaded shank 25 connecting an inner anchoring plate 26 (disposed within and bearing against the beaded portion 2 of the holder collar) with a nut 27 bearing against the outside of this beaded portion. The nut 27 desirably fits within the bight of the loop outside the holder, so that this bight prevents the nut from rotating, and in practice this nut can easily be made so small as not to detract from the generally handsome appearance of my shade holder.

However, while I have illustrated and described my shade-holders as including a collar having a beaded portion and as having the holder stem 9 equipped with a knob 10 both for improving its appearance and for facilitating the digital movement of the stem 9 by a suitable pressure, I do not wish to be limited to these or other details of the constructions and arrangements here disclosed, it being obvious that the same might be modified in many ways without departing from the spirit of the appended claims.

I claim as my invention:—

1. In a shade holder, a supporting member having a main slot and a lateral slot leading at one end into the main slot, and a retaining member including two substantially semi-circular resilient wire arms having terminals each extending through the main slot of the supporting member, one of said terminals having a hook-like part engageable with the other terminal, the mouth of which faces toward said end of the lateral slot, the said other terminal being movable into said slot to allow same to be disengaged from the hook-like part.

2. In a shade holder, a supporting member, a bodily shiftable retaining member including a pair of resilient arms, terminals on the arms extending beyond the supporting member and located in juxtaposition so as to enable both terminals to be gripped with the fingers of one hand, means to lock the terminals together, and means whereby to prevent unlocking of the terminals except by bodily shifting of the retaining member to bring said terminals in a certain predetermined position.

3. In a shade holder, a supporting member, a retaining member including a pair of resilient arms, terminals on the arms extending beyond the supporting member and located in juxtaposition so as to enable both terminals to be gripped with the fingers of one hand, and means borne by one of the terminals and engageable with the other to lock the terminals together, said means extending without the supporting member so as to be operable exteriorly of the latter, said supporting member having a substantially T-shaped slot through which the terminals extend, the leg of the T-shaped slot being formed to receive one of the terminals to permit unlocking of the locking means.

4. In a shade holder, a supporting member, a pair of bodily shiftable resilient shade holding members carried by the supporting member, means to lock the members in shade holding position, means to prevent unlocking of said locking means, and means to allow unlocking of said locking means upon bodily shifting of said members in the plane in which same are disposed to register with said means to allow unlocking of said members.

5. In a shade holder, a supporting member, bodily shiftable shade clamping means having a pair of resilient arms, terminals on the arms, means carried by one terminal and formed for selective engagement at varying points with the other terminal for locking the terminals together, and means whereby to permit unlocking of the terminals upon bodily shifting of the clamping means to bring the terminal engaged with said locking means into register with said unlocking means.

6. In a shade holder, a supporting member, shade clamping means including a pair of resilient arms having terminals, and means carried by one terminal and formed to engage and lock the other terminal thereto in different positions to accommodate shade necks of varying diameters, said member having means which engages one of the terminals in one position of the clamping means to hold the same in said locking means and further having means which is formed in a second position of the clamping means to receive the first named terminal to allow same to move out of said locking means.

7. In a shade holder, a supporting member having a main slot and a lateral slot leading at one end into the main slot, and a shade-clamping member including two substantially semi-circular resilient wire arms having terminals both extending through the main slot of the supporting member, one of said terminals having a portion thereof provided with a plurality of consecutively disposed hook formations interchangeably engageable with the other terminal, the said portion having the mouths of all of the hook formations facing toward the end of the lateral slot, the said other terminal being movable into the said lateral slot to allow of its being engaged from any one of the said hook formations.

Signed at Chicago, October 6th, 1922.

HERMAN V. WILLMAN.